(12) United States Patent
Lloyd

(10) Patent No.: US 12,445,457 B2
(45) Date of Patent: Oct. 14, 2025

(54) SECURE, EFFICIENT AND RELIABLE TRANSMISSION OF DATA IN MISSION CRITICAL SYSTEMS

(71) Applicant: Schneider Electric USA, Inc., Andover, MA (US)

(72) Inventor: Chad Andrew Lloyd, Old Hickory, TN (US)

(73) Assignee: Schneider Electric USA, Inc., Boston, MA (US)

( * ) Notice: Subject to any disclaimer, the term of this patent is extended or adjusted under 35 U.S.C. 154(b) by 130 days.

(21) Appl. No.: 18/280,309

(22) PCT Filed: Mar. 4, 2022

(86) PCT No.: PCT/US2022/018840
§ 371 (c)(1),
(2) Date: Sep. 5, 2023

(87) PCT Pub. No.: WO2022/187576
PCT Pub. Date: Sep. 9, 2022

(65) Prior Publication Data
US 2024/0372875 A1 Nov. 7, 2024

Related U.S. Application Data

(60) Provisional application No. 63/157,269, filed on Mar. 5, 2021.

(51) Int. Cl.
*H04L 9/40* (2022.01)
*H04L 47/6275* (2022.01)

(52) U.S. Cl.
CPC ........ *H04L 63/126* (2013.01); *H04L 47/6275* (2013.01)

(58) Field of Classification Search
CPC .......... H04L 63/126; H04L 47/6275
See application file for complete search history.

(56) References Cited

U.S. PATENT DOCUMENTS

| | | | |
|---|---|---|---|
| 6,125,398 A | 9/2000 | Mirashrafi et al. | |
| 8,139,581 B1 | 3/2012 | Mraz et al. | |
| 2020/0059776 A1 | 2/2020 | Martin et al. | |

FOREIGN PATENT DOCUMENTS

CN 104836745 B 12/2017

OTHER PUBLICATIONS

International Search Report and Written Opinion mailed Jun. 29, 2022 in corresponding International Application No. PCT/US2022/018840, 15 pages.

(Continued)

*Primary Examiner* — Normin Abedin
(74) *Attorney, Agent, or Firm* — Troutman Pepper Locke LLP

(57) ABSTRACT

Techniques for managing data flowing from mission critical systems. Embodiments include receiving a plurality of data values to transmit to a remote system using a unidirectional data communications network. The data values are prioritized according to a plurality of priority levels and the prioritized plurality of data values are grouped into one or more data updates for each of the plurality of priority levels. Embodiments enqueue the one or more data updates into a respective transmission queue corresponding to each of the plurality of priority levels and transmit the data updates over the unidirectional data communications network in an order determined based on the respective priority levels of the transmission queues.

20 Claims, 6 Drawing Sheets

(56) References Cited

OTHER PUBLICATIONS

Extended European Search Report dated Jan. 7, 2025 for corresponding European Patent Application No. 22764108.1-1206, 17 pages.

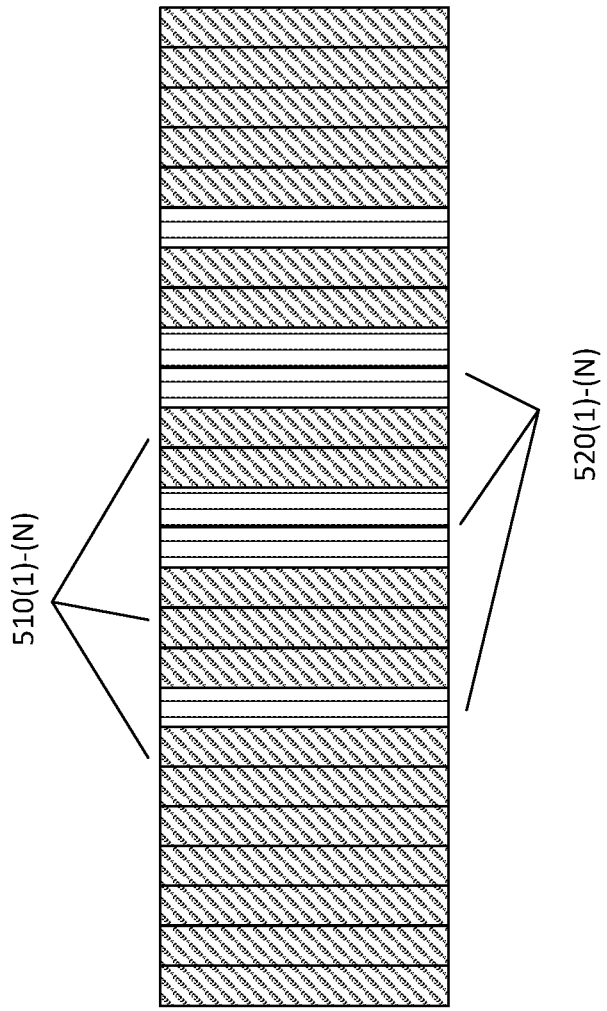

SECURE, EFFICIENT AND RELIABLE TRANSMISSION OF DATA IN MISSION CRITICAL SYSTEMS

CROSS-REFERENCE TO RELATED APPLICATIONS

This application claims priority to and the benefit of U.S. Provisional Application No. 63/157,269, filed Mar. 5, 2021, the entire contents of which are herein incorporated by reference in their entirety.

TECHNICAL FIELD

The present disclosure relates to computer networking, and more particularly, to an improved data transmissions technique for sending data in a mission critical system.

BACKGROUND

While many systems today collect and transmit performance data, mission critical systems have specific requirements and security constraints that impose additional technical challenges and limitations on the transmission of data from these systems. In particular, many mission critical systems are connected with non-mission critical systems using a unidirectional data communications network, where data can flow from the mission critical systems to the non-mission critical systems but cannot flow the other direction (i.e., from the non-mission critical systems to the mission critical systems). As such, many conventional data communications protocols are inapplicable to these networks (e.g., because acknowledgements cannot be sent back to the mission critical systems, indicating that the data was successfully received).

BRIEF DESCRIPTION OF THE DRAWINGS

A more detailed description of the disclosure, briefly summarized above, may be had by reference to various embodiments, some of which are illustrated in the appended drawings. While the appended drawings illustrate select embodiments of this disclosure, these drawings are not to be considered limiting of its scope, for the disclosure may admit to other equally effective embodiments.

Identical reference numerals have been used, where possible, to designate identical elements that are common to the figures. However, elements disclosed in one embodiment may be beneficially utilized on other embodiments without specific recitation.

FIG. 5 is a block diagram illustrating a transmission of key frame fragments of a key frame with interspersed high priority data updates, according to one embodiment described herein.

DETAILED DESCRIPTION

Figure 1A:
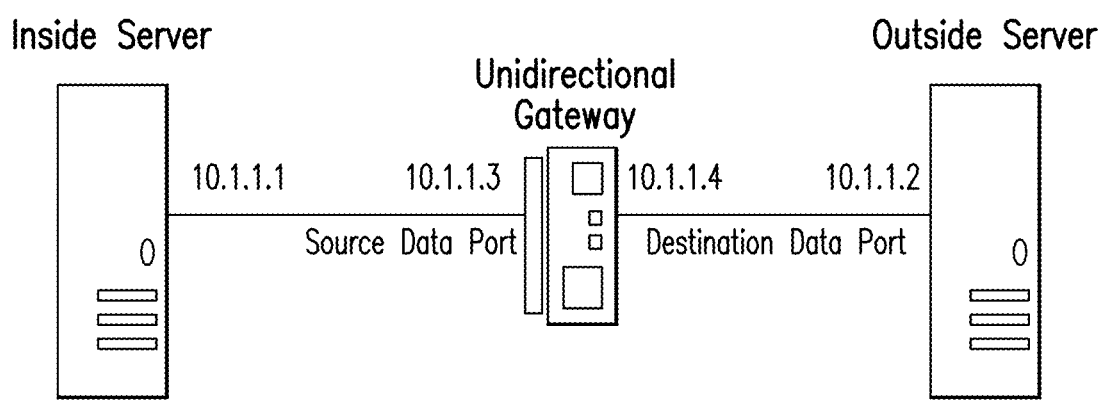
FIG. 1A is a block diagram illustrating a data communications system for transmitting data from an internal server to an outside server using a unidirectional data communications network, according to one embodiment described herein.

Embodiments described herein provide techniques for secure, efficient and reliable data transmission in mission critical systems. Data exchange is becoming common in even the most critical of systems. Historically critical systems have been isolated and designed to work with no need for data exchange with third party systems. However, critical systems are changing to react to the new demands of the connected world. Some of the connections are a result of centralized control (e.g., an oil field with multiple pump-and-rod installations miles apart communicating over Global System for Mobiles (GSM) modems) while others are related to the specific customer needs (e.g., sharing energy savings data or tracking weather data to determine if a data center should move virtual loads to another region to avoid a natural disaster). These new connections are commonly established using generic IT-centric security appliances.

As described herein, embodiments provide a secure, efficient and reliable means of transferring mission critical data in systems which transmit process-style data (e.g., tags, or points, coupled with alarms and other complex data structures). Embodiments can work with guaranteed delivery systems as well as telemetry based (non-guaranteed) delivery mechanisms. The data transmission is also unidirectional in nature (no acknowledgements of receipt are allowed according to the security policy and procedures typically in place in mission critical environments), providing a secure method of egressing data without allowing data ingress.

Embodiments described herein can provide Quality of Service (QoS) functionality within the data stream by providing multiple priorities for various data types. Additionally, embodiments provide strong symmetric data encryption for the data stream, as well as index pages providing for fast data transmission by means of cached lookups. Emergent egress management is implemented in some embodiments, which selectively allows particular data values to bypass QoS functionality, e.g., in the case of emergencies.

Mission critical systems, namely Supervisory Control and Data Acquisition (SCADA) systems and Programmable Logic Controllers (PLCs), are generally comprised of tags (or points) that represent real-time data as well as alarms and other complex objects (waveforms, manufacturing recipes, bills of materials, etc.). While conventional systems such as Open Platform Communications (OPC) and Open Platform Communications-United Architecture (OPC-UA) offer varying levels of security in these existing protocols and techniques, when this data is pushed through a unidirectional gateway, there is little ability to customize the data throughput (e.g., for specific tags or objects) and the interface is generally not robust enough for telemetry (or non-guaranteed delivery) applications.

Embodiments described herein provide techniques for egressing mission critical data to non-mission critical applications. Embodiments employ an approach that is tolerant to missing data for low-priority elements, which is acceptable for non-mission critical applications even though this would be unacceptable for internal mission critical communications. Generally, when transmitting mission critical data to non-mission critical systems, the transmission of data is unidirectional in nature. That is, data flows from the mission critical system to the non-mission critical system, but data cannot flow in the reverse direction (i.e., from the non-mission critical system to the mission critical system). Such a configuration helps to preserve the security of the mission critical system.

An exemplary system is shown in FIG. 1A, which is a block diagram illustrating a data communications system for transmitting data from an internal server to an outside server using a unidirectional data communications network, according to one embodiment described herein. As shown, the system 100 includes an inside server within a mission critical environment that is configured to egress data to an outside server that is outside of the mission critical environment using a unidirectional gateway device.

Generally, the flow of mission critical data is stream oriented. That is, the data is not finite, the data arrives and/or is collected in real time, and the expectation is that the data is transmitted as soon as possible. Additionally, mission critical data is typically ordered. In the event the data arrives out of order, the receiving non-mission critical application is responsible for discarding the old/outdated packets. Mission critical data also has the capability of variable bit rates. In mission critical systems, constant bit rates are necessary for billing applications (e.g., for accurate consumption calculations), but variable bit rates are necessary for abnormal scenarios (e.g., peak avoidance, power system events and cyber security attack response). Real-time mission critical data systems are generally also capable of surviving connection loss, and generally are configured to remain current (i.e., a recent value is generally more desirable than an older packet that was dropped). Note that there are exceptions to this when dealing with transients or alarm conditions, and embodiments described herein can handle such exceptions using additional key frame techniques (e.g., sending alarm digests or performing an alarm interrogation).

Mission critical data is also frequently compressed using a suitable data compression algorithm. In mission critical applications, a lossless compression algorithm (e.g., standard zip/gzip) is often used, as in such application it is generally considered unacceptable to have an incorrect data value (e.g., as could be produced by a lossy compression algorithm). Generally, systems receiving data from mission critical systems can tolerate missing packets in some circumstances, but the data received must be correct according to the system specifications. Additionally, while these receiving systems may be tolerant of missing packets to an extent, the receiving system must still have a mechanism for determining that a packet was missed. That is, the receiving system may employ a procedure to determine that a packet was lost, but the receiving system may not have a way to recover the lost data from the packet. Moreover, the receiving system in such a scenario is generally unable to request retransmission of the data, as the data is being egressed from the mission critical system using a unidirectional network.

Mission critical data is also generally encrypted. In mission critical applications, security is paramount and embodiments described herein use a symmetric algorithm with sufficient key length to ensure security.

Mission critical systems generally have many levels and/or priorities and embodiments described herein can account for these levels and/or priorities when egressing data to non-critical systems. For instance, an alarm may have a priority of "high" while a real-time value for energy readings may be a priority of "normal". For this reason, embodiments can implement the concept of QoS and priority within the stream.

Figure 1B:
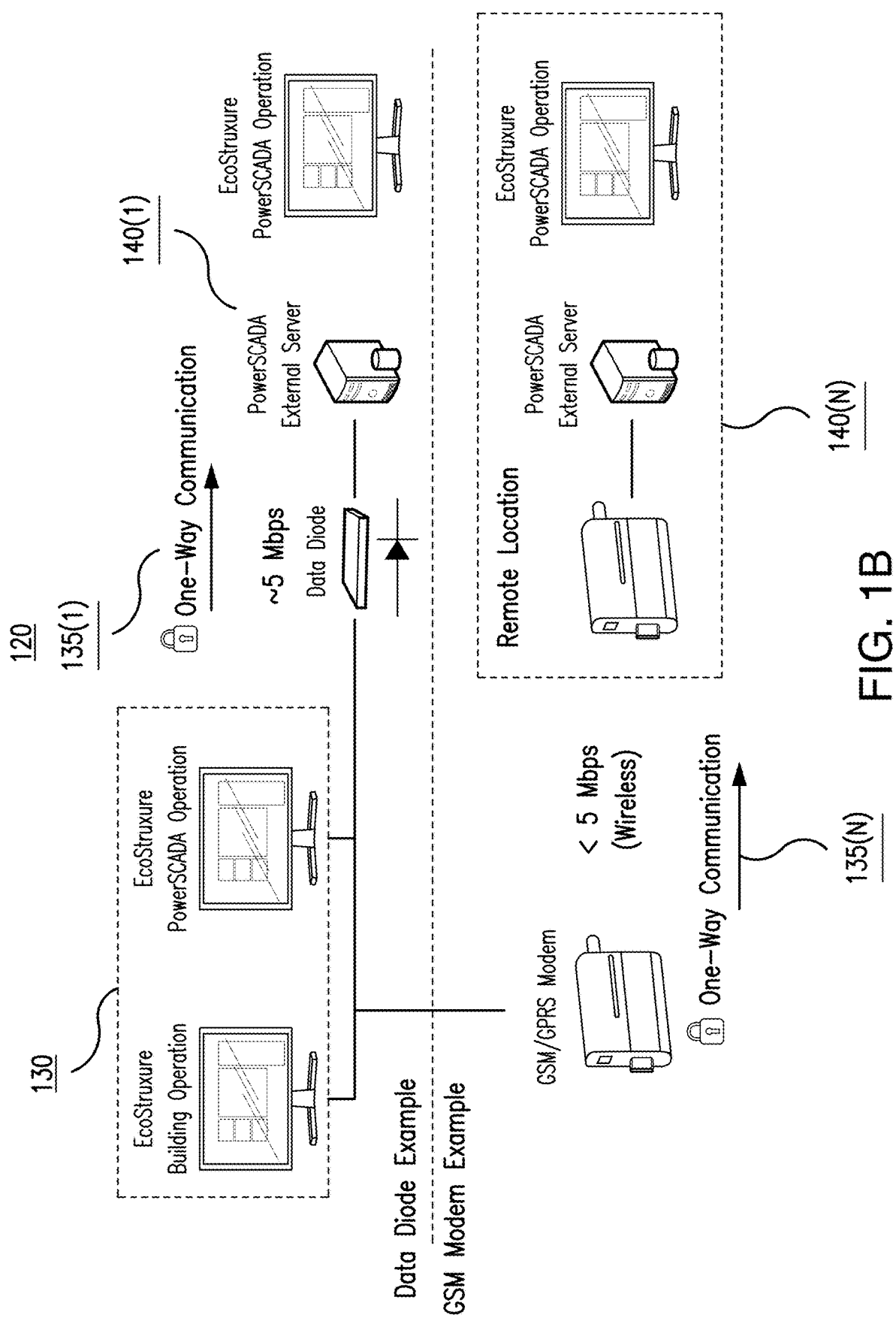
FIG. 1B is a diagram illustrating a data communications system for transmitting data from an internal server to multiple outside servers using unidirectional data communications networks, according to one embodiment described herein.

FIG. 1B is a diagram illustrating a data communications system for transmitting data from an internal server to multiple outside servers using unidirectional data communications networks, according to one embodiment described herein. As shown, the diagram illustrates a system 120 that includes a mission critical system 130. Generally, the mission critical system 130 represents a computing environment where it is desirable for data to be able to flow out of the environment, but external data is not able to flow into the environment. There are numerous advantages to such system designs, including increased security by preventing any external data messages from flowing into the system that could potentially, if allowed into the system, take advantage of any security vulnerabilities of the system. However, it can still be desirable for data to flow out of the mission critical system 130, and generally speaking such data flowing from the mission critical system 130 does not present the same security challenges are data flowing into the system 130.

As shown, the mission critical system 130 is configured to transmit data to multiple external locations 140(1)-(N) using multiple unidirectional data communications networks 135(1)-(N). In the depicted embodiment, these unidirectional data communications networks 135(1)-(N) can be of varying speeds. For example, as depicted, the unidirectional data communications network 135(1) has a speed of 5 Megabits per second (Mbps), while the unidirectional data communications network 135(N) has a speed of less than 5 Mbps. More generally, however, any unidirectional data communications network that allows data to flow out of, but not into, a computing environment can be used, consistent with the functionality described herein.

In one embodiment, a data priority management component for the mission critical system 130 could be configured to receive a plurality of data values to transmit to a remote system using unidirectional data communications networks. The data priority management component could prioritize the plurality of data values according to a plurality of priority levels. The data priority management component could then group the prioritized plurality of data values into one or more data updates for each of the plurality of priority levels. Additionally, the data priority management component could enqueue the one or more data updates into a respective transmission queue corresponding to each of the plurality of priority levels, and could transmit the data updates over the unidirectional data communications network in an order determined based on the respective priority levels of the transmission queues.

In doing so, the data priority management component could utilize a transmission buffer configured to hold one or more data updates, and the data priority management component could fill the transmission buffer with data updates, giving preference to higher priority data updates first. For example, the data priority management component could initially fill the transmission buffer using the data updates from the highest priority transmission queue, and could repeat this process for each lower priority transmission queue until the transmission buffer is full or until all transmission queues are empty. The data priority management component could then begin transmitting data from the beginning of the transmission buffer across the unidirectional data communications networks 135(1)-(N).

If, at some point in the future, new data values are generated and/or received by the data priority management component, the data priority management component could generate one or more data updates corresponding to the new data values and could assign the generated data update(s) a priority value. For instance, the data priority management component could assign the priority value based on a data type of the new data values. As an example, the data priority management component could assign the generated data update(s) a high priority value if the new data values are alarms and/or critical instantaneous data readings. As another example, the data priority management component could assign the generated data update(s) a low priority value if the new data values are energy and consumption metrics. However, such examples are provided for illustrative purposes only, and more generally any number of priority values for any number of different types of data can be used, consistent with the functionality described herein.

The data priority management component could then insert the newly generated data update(s) into the transmission buffer, at a position corresponding to the priority level assigned to the generated data update(s). For example, if the data update(s) are assigned a high priority level, the data priority management component could insert the data update(s) into the transmission buffer at a position ahead of all data update(s) having a lower priority level. Doing so ensures that high priority data is transmitted to the external system more quickly. This is particularly true in embodiments where the amount of data being generated by the mission critical system 130 exceeds the network bandwidth of the unidirectional network. For example, if the mission critical system 130 is generated 5 Mbps worth of data values over a window of time, the unidirectional data communications network 135(N) would not be able to transmit these data values in real-time due to the network having a bandwidth of less than 5 Mbps. As such, by using the techniques described herein, embodiments can ensure the highest priority data values are transmitted ahead of lower priority data values, thereby improving the performance of the system and especially in systems with limited unidirectional network throughput.

The data priority management component can further be configured to periodically transmit a key frame to one or more external systems over the unidirectional data communications networks. As defined herein, the key frame represents a snapshot of monitored data values at the mission critical system 130 at a given moment in time. For example, the mission critical system could be configured to monitor a plurality of data metrics of various priority levels, and the key frame can include a data value for each of the plurality of data metrics at a given timestamp. Such a key frame can be divided into a plurality of key frame fragments, representing portions of the key frame and each containing one or more data values from the snapshot of data values.

However, even when transmitting such key frame fragments, the data priority management component can be configured to priority the transmission of data updates having a priority level greater than a predefined threshold level of priority. For example, in one embodiment, the data priority management component could be configured to prioritize high priority data updates over key frame fragments. In such an example, if the data priority management component receives one or more high priority data updates during the transmission of the key frame fragments, the data priority management component could pause transmitting the key frame fragments and could begin transmitting the one or more high priority data updates over the unidirectional networks. Once all high priority data updates have been transmitted, the data priority management component could resume transmitting the key frame fragments. In doing so, the data priority management component ensures that the most important (i.e., updates having the highest priority level) are transmitted as quickly as possible, while still ensuring that snapshots of all data values (i.e., key frames) are periodically transmitted to the external system.

Figure 2:
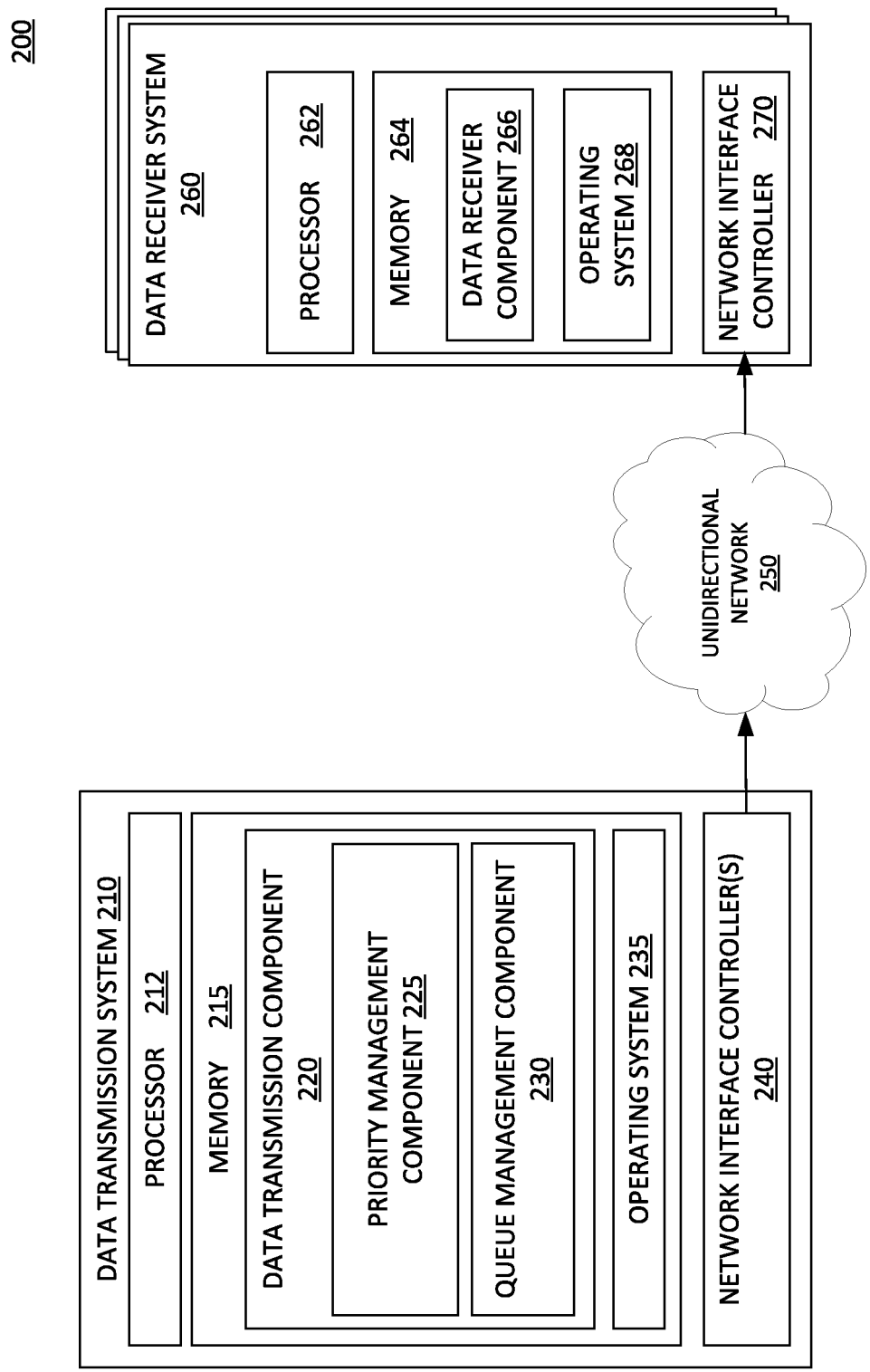
FIG. 2 is a block diagram illustrating a more detailed view of a data communications system shown in FIG. 1, according to one embodiment described herein.

FIG. 2 is a block diagram illustrating a more detailed view of a data communications system shown in FIG. 1, according to one embodiment described herein. As shown, the system 200 includes a data transmission system 210, a unidirectional data communications network 250 and a data receiver system(s) 260. Generally, the unidirectional data communications network 250 represents any suitable unidirectional data communications network, with examples including (without limitation) a unidirectional local area network (LAN), a wide area network (WAN), a unidirectional wireless network, and so on.

The data transmission system 210 includes one or more computer processors 212, a memory 215, an input module(s) 220, and a network interface controller 240. The data transmission system 210 can also include one or more input modules (not shown) that represent devices that provide inputs to the data transmission system 210. Such inputs may be provided, for example, in the form of digital inputs or analog signals. In the case of analog signals, the input module can include circuitry for converting the analog signals into logic signals that can be processed by the processor 212. The memory 215 contains a data transmission component 220 and an operating system 235.

The data transmission component 220 includes a priority management component 225 and a queue management component 230. Generally, the priority management component 225 is configured to assign priority levels to data values collected by the data transmission system 210 (e.g., data values received from the one or more input devices). The priority management component 225 can assign the priority levels based on a variety of different criteria including, without limitation, a data type of the data values, an input device from which a data value was collected, a data value exceeding a predefined threshold level, and so on. More generally, any suitable prioritization technique can be used, consistent with the functionality described herein.

The prioritized data values can then be grouped into data updates and the queue management component 230 can place the data updates into a respective transmission queue according to the corresponding priority level. The queue management component 230 can then transmit data updates from the transmission queues in an order according to the priority levels corresponding to the transmission queues using the unidirectional network 250, e.g., data updates in higher priority transmission queues can be transmitted before data updates in lower priority transmission queues.

The data receiver system 260 includes a processor 262, a memory 265 and a network interface controller 270. The memory 265 includes a data receiver component 266 and an operating system. Generally, the data receiver component 266 can receive the key frames from the data transmission component 220 over the unidirectional network 250, and can process the received key frames to extract the data from the key frames and process the data in an application-specific manner. For instance, the data receiver component 266 could generate a graphical user interface (GUI) illustrating a graphical representation of the received data. As an example, if the received data includes temperature values for a particular sensor within the mission critical system, the data receiver component 266 could generate a graphical representation illustrating the received temperature value and color-coded depending on a predefined range the temperature is in (e.g., the temperature value could be displayed in green when it is in an acceptable range and red if the temperature value exceeds the acceptable range). More generally, numerous different ways for processing the received data exist and the data receiver component 266 can be configured to handle the received data in any suitable fashion, consistent with the functionality described herein.

According to one embodiment described herein, an agreement exists between the transmitter and the receiver about the data to transfer, the compression mechanism employed and the security secrets to be used. In one embodiment, this configuration is done out of band in that this information is pre-shared and it is not transferred across the communication medium. In a particular embodiment, the configuration is transmitted dynamically from the transmitter to the receiver using any suitable format for describing the data transmittal configuration. Generally, the configuration acts as a contract and the transmitter and receiver are configured to abide by the contract.

In addition to specifying the data to transfer (e.g., tags, alarms, etc.), the configuration can also include the classifications of the data. For example, the data can be tagged with a priority value so that it is handled properly by the transmitter and receiver. Some data is more tolerant of packet loss during transmission (e.g., real-time data), whereas the transmission of other data may, in practice, need a guaranteed delivery (e.g., alarms). As such, the configuration defining attributes of the data transfer process can account for these In one embodiment, a data transmission component on a data transmitter system first reads the configuration to take inventory of the data that it is responsible for sending. The data transmission component could then provision the data according to the priority specified in the configuration. The data transmission component could also define a transmit queue for each priority and data updates are generated with current data for each queue. The data transmission component could start a timer for each priority level (using the interval specified by the configuration) and could generate and transmit a data update each time the timer elapses. Additional logic may be employed to make data updates more frequent when abnormal events occur or other events take place.

In addition to key frames, the data transmission component monitors the system for data changes and sends off a packet of changes as frequently as allowed by the configuration (a "sleep interval" is defined that throttles updates). In one embodiment, a race condition occurs in that a key frame may be in progress when a data change update is sent. The data transmission component can timestamp each data change update so that the receiver selects the most recent data when processing key frames. In one embodiment, a specific priority can be placed for emergency situations. The data transmission component could move data marked with this priority to the front of the queue to be transmitted immediately.

In one embodiment, for each packet of data that is sent (key frames and data updates), the process is as follows:
  Gather the data from the underlying system
  Encrypt the data with the symmetric key stored in the configuration
  Compress the data
  Send the data
A key frame can be shown as a table that includes one row for each data component to be transferred. For example:

| Index | Tag/Point Name | Data Timestamp | Value | Transmit Timestamp |
|---|---|---|---|---|
| 0 | Voltage/PhaseA | May 29, 2019 12:51:14.002 PM | 278.4 | May 29, 2019 12:51:14.579 PM |
| 1 | Frequency | May 29, 2019 12:51:14.004 PM | 59.9 | May 29, 2019 12:51:14.580 PM |

Example 1—Key Frame

In Example 1, the columns are as follows:
Index—this is used by the receiver to match an incoming update record to the matching tag. (Tag names are not sent with update packets, they are only sent with key frames to cut down on network traffic.)
Tag/Point Name—this is used by the receiver to correctly identify the data to push to the underlying system.
Data Timestamp—this is the time that the data was recorded by the underlying system.
Value—this is the value for this tag. Note that this value may be a complex object such as an alarm or waveform. It may also have metadata attached such as quality or timestamp quality.
Transmit Timestamp—this is the exact time the data was read from the underlying system and placed in the key frame. This is necessary for the receiver to compare key frames with updates and ensure that the most recent data is provided to the underlying system.

In one embodiment, updates are sent in between key frames when data changes occur (throttled by configuration). Data updates can be visualized as a table that contains one record for every data update. For example:

| Index | Data Timestamp | Value | Transmit Timestamp |
|---|---|---|---|
| 0 | May 29, 2019 12:51:14.002 PM | 278.4 | May 29, 2019 12:51:14.579 PM |
| 1 | May 29, 2019 12:51:14.004 PM | 59.9 | May 29, 2019 12:51:14.580 PM |

Example 2—Update

In Example 2, the columns are as follows:
Index—this is used by the receiver to match an incoming update record to the matching tag. Note that update records that arrive before the first key frame are discarded as they cannot be processed (there is no way to lookup the tag name from the index).
Data Timestamp—this is the time that the data was recorded by the underlying system.
Value—this is the value for this tag. Note that this value may be a complex object such as an alarm or waveform. It may also have metadata attached such as quality or timestamp quality.
Transmit Timestamp—this is the exact time the data was read from the underlying system and placed in the key frame. This is necessary for the receiver to compare key frames with updates and ensure that the most recent data is provided to the underlying system.

In one embodiment, the data transmission component employs a process comprising, for each packet of data (key frames and data updates) that is received:

Decompress the data
Decrypt the data with the symmetric key stored in the configuration
Process the data In one embodiment, the receiver contains computer logic that allows discrimination of the data depending on the priority and the packet type. When a packet is received, the data receiver component can first determine if the packet is a key frame or a data update packet. If the packet is determined to be a key frame, the data receiver component can place the packet in a holding area waiting to be processed. In one embodiment, only one key frame is retained; in the unlikely event that multiple key frames begin to stack up as a result in delayed processing, only the most recent key frame is retained. In a particular embodiment, the exception to this rule is for alarms (e.g., where all data updates and key frame fragments are guaranteed to be processed).

The data receiver component can then process data updates and key frame fragments in the order of their priority. Key frames may contain necessary information to process upcoming updates. The data receiver component can cache the index and tag names of each record in the data update and key frame fragment, thereby allowing for a smaller update packet (as tag names can get very long). When processing the data updates and key frame fragments, the data receiver component can compare the transmit timestamp with any cached data timestamps to ensure that only the most recent data is retained.

In one embodiment, the data receiver component is configured to process update records one record at a time. The data receiver component can use the index value to lookup the tag name (provided by a previous data update or key frame fragment). The data receiver component can compare the transmit timestamp to cached data (provided by a previous update or key frame) to ensure that only the most recent data is retained. In one embodiment, update records are also subject to be discarded if the receive buffer is full.

According to a particular embodiment, the algorithm for a three priority system (high, normal, low) is described below (but could be extended for any number of priorities):

If the record is high priority and the buffer is full, low priority and normal priority update records are removed (in that order) until enough space is available for the new high priority record. If necessary, high priority records are removed until enough space is available. Records are removed in chronological order (oldest removed first).

If the record is normal priority and the buffer is full, low priority update records are removed until enough space is available for the new normal priority record. If necessary, normal priority records are removed until enough space is available. Records are removed in chronological order (oldest removed first). No high priority records are removed.

If the record is low priority and the buffer is full, low priority update records are removed until enough space is available for the new low priority record. Records are removed in chronological order (oldest removed first). No high or normal priority records are removed.

In one embodiment, data update packets can be marked for emergency egress. Packets with this designation will bypass all queues, are not subject to removal and will be processed immediately.

A common use case for this concept is for data egress in mission critical systems. Of note, however, while embodiments herein are described with respect to mission critical systems, the systems and techniques described herein can be applied in a variety of different contexts and the examples involving mission critical systems are provided for illustrative purposes and without limitation. Returning to an embodiment involving mission critical systems, this may be done with a unidirectional gateway, but could also be achieved with a layer 2/3 firewall or other appropriate device. For instance, a college campus may have invested heavily in an energy savings initiative and would like to show their student body the campus energy consumption on a kiosk in the student union building. The unidirectional gateway would sit between the secure (power systems) network and the less-secure (student/public) network. The data transmission approach presented herein could ensure that the kiosk receives frequent and reliable updates.

Another common use case involves distributed systems where many field devices collect data. This data transmission approach could be used to federate this data to a centralized location over unreliable transmission mediums such as GSM. An example is an oil field with many devices spread across multiple miles communicating over the cellular network. Currently, these systems suffer a multitude of errors as a result of the disconnectedness of the communications. Additionally, these systems generally use legacy protocols that have no element of security. Embodiments described herein provide a secure, reliable connection (over a generally non-reliable medium) due to the self-healing nature of this design.

Figure 3:
FIG. 3 is a flow diagram illustrating a method for transmitting prioritized data over a unidirectional data communications network, according to one embodiment described herein.

FIG. 3 illustrates a method for transmitting data (e.g., data from a mission critical system to a non-critical system) over a unidirectional network, according to one embodiment described herein. As shown, the method 300 begins at block 310, where the data transmission component 220 receives a plurality of data values to transmit to a remote system using a unidirectional data communications network. The data transmission component 220 prioritizes the plurality of data values according to a plurality of priority levels (block 315).

The data transmission component 220 groups the prioritized plurality of data values into one or more data updates for each of the plurality of priority levels (block 320). Additionally, the data transmission component 220 enqueues the one or more data updates into a respective transmission queue corresponding to each of the plurality of priority levels (block 325). In the depicted embodiment, the data transmission component 220 transmits the data updates over the unidirectional data communications network in an order determined based on the respective priority levels of the transmission queues (block 330). Additionally, the data transmission component 220 transmits a key frame containing a snapshot of monitored data values at a given point in time, where the key frame comprises a plurality of key frame fragments and where transmission at least one data update is interspersed between transmission of two or more of the plurality of key frame fragments, based on a priority level associated with the at least one data update (block 335), and the method 300 ends.

Figure 4:
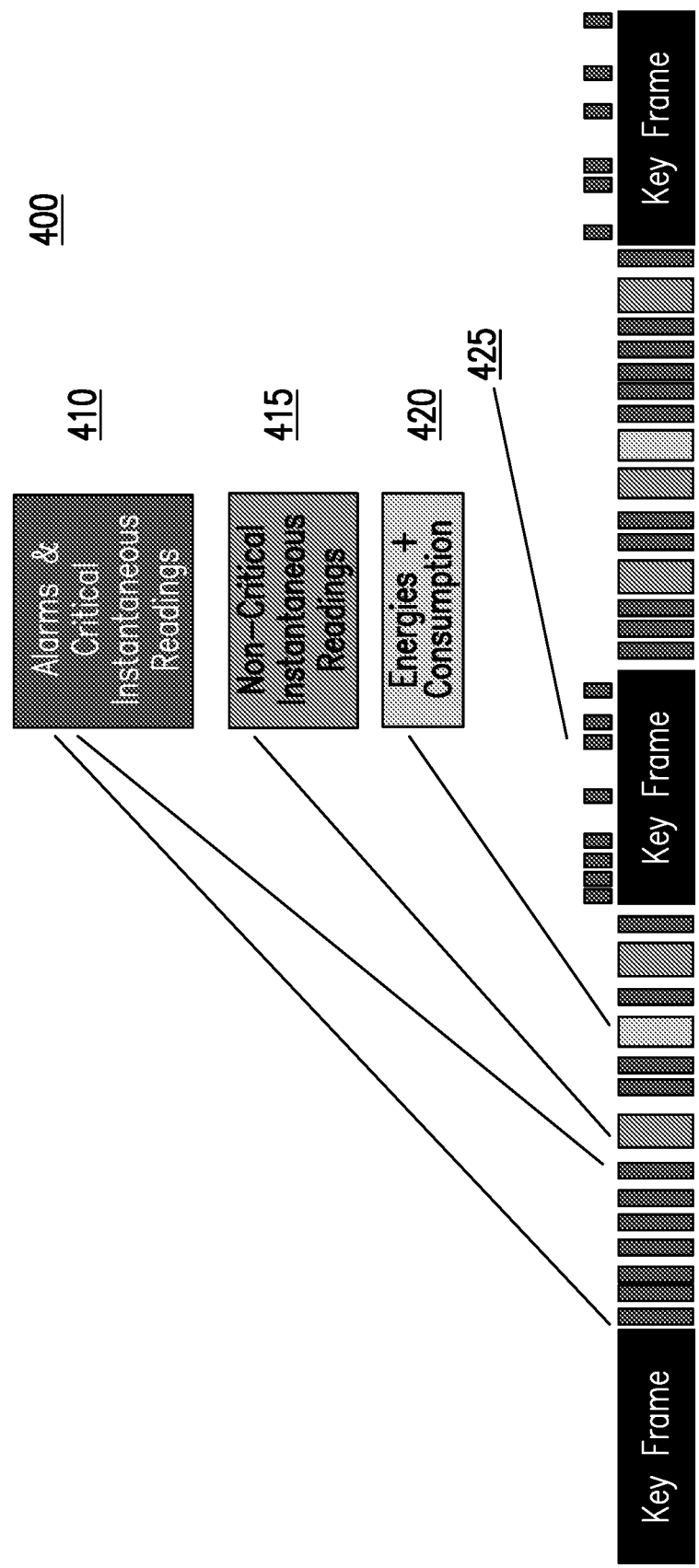
FIG. 4 is a diagram illustrating the transmission of key-frames containing data values of various priority levels from a mission critical system, according to one embodiment described herein.

FIG. 4 is a diagram illustrating the transmission of keyframes containing data values of various priority levels from a mission critical system, according to one embodiment described herein. As shown, the diagram 400 includes a plurality of key frames of various priority levels. In the depicted example, the data priority management component is configured to assign three different priority levels to data values, where alarms and critical instantaneous readings 410 are assigned the highest priority level, non-critical instantaneous readings 415 are assigned a medium priority level and energies and consumption metrics 420 are assigned the lowest priority levels.

In the depicted embodiment, the data priority management component has transmitted three key frames over the window of time. As discussed above, a key frame can refer to a full snapshot of the data of the mission critical system. Of note, however, as shown during the transmission of the key frame 425, numerous data value updates for alarms and critical instantaneous readings 410 having the highest priority level were interspersed during the transmission of the key frame 425. As discussed above, the key frame data as well as the data value updates can be associated with timestamp values, and the receiving system can be configured to discard any later received values having a timestamp that predates an earlier received value.

FIG. 5 is a block diagram illustrating a transmission of key frame fragments of a key frame with interspersed high priority data updates, according to one embodiment described herein. As shown, the diagram 500 illustrates the transmission of key frame fragments 510(1)-(N) of a key frame of data from a mission critical system. As described herein, the key frame can include a full snapshot of the data on the mission critical system at a particular point in time. Such a snapshot can include a plurality of data values monitored on the mission critical system, ranging from the lowest priority data values to the highest priority data values.

In the depicted embodiment, a number of the transmission of the key frame fragments 510(1)-(N) are interspersed with the transmission of a number of high priority updates 520(1)-(N). As discussed above, the priority management component 225 can be configured to prioritize the transmission of data updates based on respective priority levels and can transmit higher priority updates even during the transmission of a key frame. If, for example, the receiving system receives a high priority update 520(1)-(N) for a first data value and subsequently receives an update to the first data value in the key frame fragments 510(1)-(N), the receiving system can be configured to compare timestamps associated with the values and to use the value with the most recent timestamp (e.g., discarding the value(s) with older timestamps). Doing so enables higher priority updates to reach the external system more quickly, which is particularly advantageous on unidirectional networks with limited bandwidth.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is to be understood that the above description is intended to be illustrative, and not restrictive. Many other implementation examples are apparent upon reading and understanding the above description. Although the disclosure describes specific examples, it is recognized that the systems and methods of the disclosure are not limited to the examples described herein but may be practiced with modifications within the scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

I claim:

1. A method, comprising:
    receiving a plurality of data values to transmit to a remote system using a unidirectional data communications network;
    prioritizing the plurality of data values according to a plurality of priority levels;
    grouping the prioritized plurality of data values into one or more data updates for each of the plurality of priority levels;
    enqueueing the one or more data updates into a respective transmission queue corresponding to each of the plurality of priority levels; and
    transmitting the data updates over the unidirectional data communications network in an order determined based on the respective priority levels of the transmission queues, comprising:
        initiating transmission of a key frame of data over the unidirectional data communications network, wherein the key frame comprises a plurality of key frame fragments and wherein the key frame contains a snapshot of monitored data values at a given point in time;
        subsequent to transmitting at least one of the plurality of key frame fragments but prior to transmitting at least one remaining key frame fragment of the plurality of key frame fragments, receiving one or more data values corresponding to a high priority level;

generating at least one data update containing the one or more data values corresponding to the high priority level; and transmitting the at least one data update ahead of the at least one remaining key frame fragment.

2. The method of claim 1, further comprising:

receiving a first record containing one or more data values to be transmitted via the unidirectional data communications network; and determining that the first record is a high priority record, relative to other record priorities on a local system.

3. The method of claim 2, further comprising:

upon determining that the first record is a high priority record:

generating at least one high priority data update containing the one or more data values of the first record; and enqueueing the at least one high priority data update into a high priority transmission queue.

4. The method of claim 3, further comprising:

transmitting the at least one high priority data update over the unidirectional data communications network prior to transmitting at least one lower priority data update, wherein the at least one high priority data update was generated and enqueued subsequent to the generation and enqueueing of the at least one lower priority data update, wherein the at least one lower priority data update is associated with a lower priority record relative to the high priority record, and wherein the at least one lower priority data update was enqueued into a lower priority transmission queue relative to the high priority transmission queue.

5. The method of claim 1, wherein the unidirectional data communications network is configured to transmit data from a mission critical site to one or more external networks, and wherein the unidirectional data communications network is configured to not allow the transmission of data into the mission critical site.

6. The method of claim 1, wherein transmitting the data updates over the unidirectional data communications network in an order determined based on the respective priority levels of the transmission queues further comprises:

managing a transmission buffer for use in transmitting the data updates over the unidirectional data communications network, wherein data updates are added to the transmission buffer in an order and/or at a position based on their respective priority level.

7. The method of claim 6, wherein transmitting the data updates over the unidirectional data communications network in an order determined based on the respective priority levels of the transmission queues further comprises:

generating one or more data updates associated with a high priority level;

determining that the transmission buffer is currently full;

determining that the transmission buffer currently contains one or more lower priority data updates, relative to the high priority level;

removing the one or more lower priority data updates from the transmission buffer;

enqueueing the one or more lower priority data updates into a transmission queue corresponding to the lower priority level;

adding the generated one or more data updates associated with the high priority level to the transmission buffer; and transmitting contents of the transmission buffer over the unidirectional data communications network to one or more servers.

8. A system, comprising:

one or more computer processors; and a non-transitory computer-readable memory containing computer program code that, when executed by operation of the one or more computer processors, performs an operation comprising:

receiving a plurality of data values to transmit to a remote system using a unidirectional data communications network;

prioritizing the plurality of data values according to a plurality of priority levels;

grouping the prioritized plurality of data values into one or more data updates for each of the plurality of priority levels;

enqueueing the one or more data updates into a respective transmission queue corresponding to each of the plurality of priority levels;

transmitting the data updates over the unidirectional data communications network in an order determined based on the respective priority levels of the transmission queues; and transmitting a key frame containing a snapshot of monitored data values at a given point in time, wherein the key frame comprises a plurality of key frame fragments and wherein transmission at least one data update is interspersed between transmission of two or more of the plurality of key frame fragments, based on a priority level associated with the at least one data update.

9. The system of claim 8, the operation further comprising:

receiving a first record containing one or more data values to be transmitted via the unidirectional data communications network; and determining that the first record is a high priority record, relative to other record priorities on a local system.

10. The system of claim 9, the operation further comprising:

upon determining that the first record is a high priority record:

generating at least one high priority data update containing the one or more data values of the first record; and enqueueing the at least one high priority data update into a high priority transmission queue.

11. The system of claim 10, the operation further comprising:

transmitting the at least one high priority data update over the unidirectional data communications network prior to transmitting at least one lower priority data update, wherein the at least one high priority data update was generated and enqueued subsequent to the generation and enqueueing of the at least one lower priority data update, wherein the at least one lower priority data update is associated with a lower priority record relative to the high priority record, and wherein the at least one lower priority data update was enqueued into a lower priority transmission queue relative to the high priority transmission queue.

12. The system of claim 8, wherein the unidirectional data communications network is configured to transmit data from a mission critical site to one or more external networks, and wherein the unidirectional data communications network is configured to not allow the transmission of data into the mission critical site.

13. The system of claim 8, wherein transmitting the data updates over the unidirectional data communications network in an order determined based on the respective priority levels of the transmission queues further comprises:
managing a transmission buffer for use in transmitting the data updates over the unidirectional data communications network, wherein data updates are added to the transmission buffer in an order and/or at a position based on their respective priority level.

14. The system of claim 13, wherein transmitting the data updates over the unidirectional data communications network in an order determined based on the respective priority levels of the transmission queues further comprises:
generating one or more data updates associated with a high priority level;
determining that the transmission buffer is currently full;
determining that the transmission buffer currently contains one or more lower priority data updates, relative to the high priority level;
removing the one or more lower priority data updates from the transmission buffer;
enqueueing the one or more lower priority data updates into a transmission queue corresponding to the lower priority level;
adding the generated one or more data updates associated with the high priority level to the transmission buffer; and
transmitting contents of the transmission buffer over the unidirectional data communications network to one or more servers.

15. A non-transitory computer-readable memory containing computer program code that, when executed by operation of one or more computer processors, performs an operation comprising:
receiving a plurality of data values to transmit to a remote system using a unidirectional data communications network;
prioritizing the plurality of data values according to a plurality of priority levels;
grouping the prioritized plurality of data values into one or more data updates for each of the plurality of priority levels;
enqueueing the one or more data updates into a respective transmission queue corresponding to each of the plurality of priority levels;
initiating the transfer of a key frame containing a snapshot of monitored data values at a given point in time, wherein the key frame comprises a plurality of key frame fragments; and
prior to completing the transfer of the key frame, transmitting at least one data update, based on a priority level associated with the at least one data update.

16. The non-transitory computer-readable memory of claim 15, the operation further comprising:
receiving a first record containing one or more data values to be transmitted via the unidirectional data communications network; and
determining that the first record is a high priority record, relative to other record priorities on a local system.

17. The non-transitory computer-readable memory of claim 16, the operation further comprising:
upon determining that the first record is a high priority record:
generating at least one high priority data update containing the one or more data values of the first record; and
enqueueing the at least one high priority data update into a high priority transmission queue.

18. The non-transitory computer-readable memory of claim 17, the operation further comprising:
transmitting the at least one high priority data update over the unidirectional data communications network prior to transmitting at least one lower priority data update, wherein the at least one high priority data update was generated and enqueued subsequent to the generation and enqueueing of the at least one lower priority data update, wherein the at least one lower priority data update is associated with a lower priority record relative to the high priority record, and wherein the at least one lower priority data update was enqueued into a lower priority transmission queue relative to the high priority transmission queue.

19. The non-transitory computer-readable memory of claim 15, wherein the unidirectional data communications network is configured to transmit data from a mission critical site to one or more external networks, and wherein the unidirectional data communications network is configured to not allow the transmission of data into the mission critical site.

20. The non-transitory computer-readable memory of claim 15, the operation further comprising:
managing a transmission buffer for use in transmitting the data updates over the unidirectional data communications network, wherein data updates are added to the transmission buffer in an order and/or at a position based on their respective priority level;
generating one or more data updates associated with a high priority level;
determining that the transmission buffer is currently full;
determining that the transmission buffer currently contains one or more lower priority data updates, relative to the high priority level;
removing the one or more lower priority data updates from the transmission buffer;
enqueueing the one or more lower priority data updates into a transmission queue corresponding to the lower priority level;
adding the generated one or more data updates associated with the high priority level to the transmission buffer; and
transmitting contents of the transmission buffer over the unidirectional data communications network to one or more servers.

* * * * *